(12) United States Patent
Podack et al.

(10) Patent No.: US 12,074,492 B2
(45) Date of Patent: Aug. 27, 2024

(54) STATOR OF AN ELECTRICAL COOLANT DRIVE, CONTACT DEVICE FOR A STATOR AND ELECTRICAL COOLANT DRIVE

(71) Applicant: Brose Fahrzeugteile SE & Co. Kommanditgesellschaft, Wuerzburg, Wuerzburg (DE)

(72) Inventors: Marcus Podack, Guestrow (DE); Stefan Wuest, Lohr am Main (DE); Marco Grimm, Unterschleissheim (DE); Duc Van Tong, Wuerzburg (DE)

(73) Assignee: Brose Fahrzeugteile SE & Co. Kommanditgesellschaft, Wuerzburg, Wuerzburg (DE)

( * ) Notice: Subject to any disclaimer, the term of this patent is extended or adjusted under 35 U.S.C. 154(b) by 270 days.

(21) Appl. No.: 17/687,740

(22) Filed: Mar. 7, 2022

(65) Prior Publication Data

US 2022/0190669 A1 Jun. 16, 2022

Related U.S. Application Data

(63) Continuation of application No. PCT/EP2020/074435, filed on Sep. 2, 2020.

(30) Foreign Application Priority Data

Sep. 6, 2019 (DE) ............ 10 2019 213 616.8

(51) Int. Cl.
*H02K 3/52* (2006.01)
*B60H 1/32* (2006.01)
*H02K 15/00* (2006.01)

(52) U.S. Cl.
CPC ........... *H02K 3/522* (2013.01); *B60H 1/3226* (2013.01); *H02K 15/0062* (2013.01); *H02K 2203/09* (2013.01)

(58) Field of Classification Search
CPC ............. H02K 3/522; H02K 15/0062; H02K 2203/09; B60H 1/3226

(Continued)

(56) References Cited

U.S. PATENT DOCUMENTS 5,898,246 A * 4/1999 Hoffman ............ H02K 9/06
310/58
2012/0091837 A1* 4/2012 Bodenstein ............ H02K 1/20
310/54

(Continued)

FOREIGN PATENT DOCUMENTS

DE 102016223576 A1 5/2018
EP 2159425 A2 3/2010

(Continued)

OTHER PUBLICATIONS

Otsubo et al., English Machine Translation of JP 2018-033197 (Year: 2018).*
English Machine Translation (Year: 2018).*

*Primary Examiner* — Rashad H Johnson
(74) *Attorney, Agent, or Firm* — Laurence A. Greenberg; Werner H. Stemer; Ralph E. Locher

(57) ABSTRACT

A stator of an electrical coolant drive includes a stator assembly having a number of stator teeth that are provided with coils of a multi-phase stator winding, and a contact device disposed on the stator assembly on an end side for interconnecting the coils with the phase connections. A deflection region is provided on the outer periphery of the contact device in the region of an inlet of the coolant drive for a fluid flowing in through the inlet. A contact device and an electric coolant drive are also provided.

9 Claims, 7 Drawing Sheets

(58) Field of Classification Search
USPC .................................. 310/52, 54, 64, 71, 89
See application file for complete search history.

(56) References Cited

U.S. PATENT DOCUMENTS

| | | | |
|---|---|---|---|
| 2014/0037435 A1* | 2/2014 | Porter | F01D 11/04 |
| | | | 415/173.7 |
| 2016/0186664 A1* | 6/2016 | Kirtley | F02C 7/28 |
| | | | 415/115 |
| 2016/0186665 A1* | 6/2016 | Johnson | F01D 5/081 |
| | | | 415/168.2 |
| 2020/0343781 A1* | 10/2020 | An | H01R 25/16 |
| 2021/0249935 A1* | 8/2021 | Long | B60K 11/02 |
| 2021/0293253 A1* | 9/2021 | Chavez Castellanos | ............ |
| | | | F04D 29/5806 |
| 2021/0293254 A1* | 9/2021 | Chavez Castellanos | ............ |
| | | | H02K 5/203 |
| 2021/0384789 A1* | 12/2021 | Mawatari | H02K 3/28 |

FOREIGN PATENT DOCUMENTS

| | | | |
|---|---|---|---|
| JP | 2013198312 A | 9/2013 | |
| JP | 2018033197 A | 3/2018 | |

\* cited by examiner

STATOR OF AN ELECTRICAL COOLANT DRIVE, CONTACT DEVICE FOR A STATOR AND ELECTRICAL COOLANT DRIVE

CROSS-REFERENCE TO RELATED APPLICATION

This application is a continuation, under 35 U.S.C. § 120, of copending International Patent Application PCT/EP2020/074435, filed Sep. 2, 2020, which designated the United States; this application also claims the priority, under 35 U.S.C. § 119, of German Patent Application DE 10 2019 213 616.8, filed Sep. 6, 2019; the prior applications are herewith incorporated by reference in their entirety.

FIELD AND BACKGROUND OF THE INVENTION

The invention relates to a stator of an electrical coolant drive, including a stator assembly having a number of stator teeth, which are provided with coils of a multi-phase stator winding, and a contact device disposed on the stator assembly at the end face. The invention furthermore relates to a contact device for such a stator, and an electrical coolant drive having such a stator.

In motor vehicles, air-conditioning units are generally installed which condition the air in the vehicle interior with the aid of a unit forming a coolant circuit. Such units basically have a circuit in which a coolant is guided. The coolant, for example R-134a (1,1,1,2-tetrafluoroethane) or R-644 (carbon dioxide) is heated at an evaporator and compressed by using a (coolant) compressor, wherein the coolant subsequently gives off the absorbed heat again through a heat exchanger before it is guided back to the compressor through a throttle.

In such applications, it is for example basically possible to use scroll machines as superchargers or compressors for the coolant. Such scroll compressors typically have two mutually relatively movable scroll parts, which function in the manner of a displacement pump during operation. In that case, the two scroll parts are typically constructed as a (helical) spiral or scroll pair nested inside one another. In other words, one of the spirals engages in the other spiral, at least in part. In that case, the first (scroll) spiral is stationary in relation to a compressor housing (stationary scroll, fixed scroll), wherein the second (scroll) spiral (movable scroll/orbiting scroll) is driven in an orbiting manner within the first spiral by using an electric motor.

An in particular brushless electric motor as an electric (three-phase) machine conventionally has a stator provided with a multi-phase field or stator winding, which is disposed coaxially to a rotor having one or more permanent magnets. Both the rotor and the stator are constructed for example as laminated cores, wherein stator teeth in intermediate stator grooves support the coils of the stator winding.

The coils are in turn customarily wound from an insulating wire and associated with individual phases of the electric motor or coolant drive and interconnected with one another in a predetermined manner by using a contact device at the stator end face. The interconnected stator winding is controlled by motor electronics in order to generate a rotating field, which creates a torque at the permanently excited motor.

In the case of such electric or electromotively driven coolant drives, the electric motors and the (motor) electronics are cooled by using a so-called suction gas (coolant). In that case, reliable cooling of the electronics and the electric motor is central to reliable and safe operation and to the continued performance of the coolant compressor. In particular, in that case, the electronics typically has a high thermal sensitivity so that reliable cooling is needed. In that case, the cold suction gas is guided to a partition wall with respect to the electronics and through the electric motor.

The coolant drive generally has a drive housing having an inlet (suction gas port connection, suction port), through which the suction gas or coolant flows into the interior of the drive housing, and therefore to the electric motor, as a fluid. The inlet is generally disposed at the outer circumference or periphery of the drive housing, so that the mass flow or fluid flow of the suction gas is admitted laterally with respect to the stator and has to be diverted in order to flow between the rotor and stator and around the windings. However, that relative position of the inlet with respect to the stator disadvantageously induces a substantially frontal impingement of the inflowing fluid or suction gas on the contact device of the stator. The contact device generally has narrow cross-sections, so that undesired suction pressure losses are induced in that case.

Such suction pressure losses reduce the efficiency of the electrical coolant drive. That reduction in the efficiency occurs in particular in the case of medium to high mass flows, for example from circa 3000 to 4000 revolutions per minute (rpm) to a maximum of approximately 8000 to 12000 rpm. In particular in the case of a full-load operation (cool down), an electrical and thermal power limit of the coolant drive is reached in a short time so that the coolant drive has to be limited to prevent damage or total destruction.

In order to prevent that problem, it is for example possible to space the inlet axially from the stator, i.e. to construct the stator with a smaller axial length or to construct the stator to be (axially) more compact in terms of installation space or shorter. As a result, the fluid flowing through the inlet does not impinge on the contact device of the stator but flows into a clearance formed axially above the stator or the contact device. However, that is only possible if the outer diameter of the stator can be increased or if the axial length of the drive housing or the coolant drive can be elongated. However, with regard to the installation space present in an installation situation, that cannot always be readily achieved in technical terms since the other components of the coolant compressor, for example the compressor or the electronics, also require an axial installation space.

It is likewise conceivable, for example, to construct the drive housing with one or more bypasses, which, as bypass paths, guide the mass flow radially externally past the stator to the stator end face disposed opposite the inlet. The cooling of the stator and in particular the electronics is thus advantageously reduced. The suction gas or fluid is furthermore heated over the course of the outer bypass guidance along the drive housing wall, whereby the cooling power provided is further reduced.

It is furthermore possible, for example, to reduce the radial outer diameter of the contact device to the greatest extent possible and/or to provide the contact device with a number of radial lead-through or passage openings. However the interconnection of the coils to form the stator winding is thus disadvantageously hindered or limited to certain interconnection patterns/concepts.

SUMMARY OF THE INVENTION

It is accordingly an object of the invention to provide a particularly suitable stator of an electrical coolant drive, a contact device for a stator and an electrical coolant drive, which overcome the hereinafore-mentioned disadvantages of the heretofore-known devices of this general type. In particular, the aim is, on one hand, to achieve as reliable and operationally safe cooling of the stator, preferably of an electric motor and associated electronics, as possible, in particular at low motor speeds, and, on the other, to reduce the suction pressure losses which occur, in particular at high motor speeds, to the greatest extent possible.

With the foregoing and other objects in view there is provided, in accordance with the invention, a stator of an electrical coolant drive, in particular of an electrical coolant compressor of a motor vehicle. The stator has a stator assembly having a number of stator teeth, wherein the stator teeth are provided with coils or coil windings of a multi-phase stator winding.

The stator furthermore has a contact device which is disposed on the stator assembly at the end face and is provided and constructed to interconnect the (stator) coils with phase connections. In this case, the phase connections are guided for example to an inverter circuit of (motor) electronics.

According to the invention, a deflection region for a fluid flowing in through the inlet, in particular radially, is provided in the region of an inlet of the coolant drive, which deflection region is disposed at the outer circumference or periphery of the contact device. A particularly suitable stator for an electrical coolant drive is thus achieved.

The deflection region is in particular provided in that region of the outer circumference or periphery of the contact device in which the inflowing fluid impinges approximately frontally on the contact device. In this case, the deflection region and the inlet are disposed in particular at approximately the same axial height of the coolant compressor. In other words, the deflection region of the contact device is disposed in an inflow or inlet region of the coolant drive.

Advantageous configurations and developments are the subject matter of the subclaims. The advantages and configurations mentioned with regard to the stator are basically also applicable to the contact device and/or the coolant drive and vice versa.

The invention starts with the awareness that the highest (suction) pressure losses in the flow course of the fluid in the coolant drive occur in the region of the inlet in which the inflowing fluid impinges on the contact device. In this case, a deflection region is understood to be in particular any contour or shape of the contact device which deflects or diverts the mass flow or fluid flow of the inflowing fluid specifically along a tangential, radial or axial direction, at least in part, so that suction pressure losses in the inlet region of the coolant drive are reduced. In other words, the contact device is formed by the deflection region as a flow-improving component with regard to the guidance of the fluid in the coolant drive. In this case, the fluid is preferably diverted or deflected in as gentle a manner as possible, i.e. preferably with little flow resistance and, in terms of the fluid mechanics, with little turbulence or swirling of the fluid flow.

The fluid is in particular a suction gas or coolant, which is used or usable for cooling the stator and/or an electric motor having the stator and for cooling the motor electronics. The conjunction "and/or" should be understood in this case and below in such a way that the features linked by this conjunction can be formed both together and as alternatives to one another. As a result of the deflection region, suction pressure losses in the inlet or inflow region are reduced, whereby the cooling power of the fluid flow for the stator or the electric motor equipped therewith is improved. This consequently translates into an advantageously improved performance and service life of the stator or a coolant drive provided therewith.

"Axially" or an "axial direction" should be understood in this case and below to refer in particular to a direction perpendicular to the end faces of the stator, i.e. parallel (coaxial) to the axis of rotation of a coolant drive provided therewith. Accordingly, "radially" or a "radial direction" should be understood in this case and below to refer in particular to a direction orientated perpendicularly (transversely) to the axis of rotation of the coolant drive, along a radius of the stator or the coolant drive. "Tangentially" or a "tangential direction" should be understood in this case and below to refer in particular to a direction along the circumference of the stator or the coolant drive (circumferential direction, azimuthal direction), i.e. a direction perpendicular to the axial direction and to the radial direction.

In an advantageous configuration, the deflection region directs the inflowing fluid radially inwards in a spiral. In other words, the deflection region is configured in such a way that, when fluid flows in through the inlet, the deflection region deflects or influences the flow direction or the flow course in such a way that the fluid is guided radially inwards in a spiral. The deflection region is formed for example as a substantially radially and tangentially extending channel-shaped or ramp-shaped guide for the inflowing fluid. Particularly expedient guidance of the fluid is thus achieved, whereby particularly low suction pressure losses occur.

In a particularly expedient embodiment, the deflection region is incorporated in the outer circumference or periphery of the contact device as a bead-shaped depression, i.e. as a cutout or recess or (inward) curvature or crown. The deflection region is thus produced or producible in a structurally particularly simple and cost-effective manner.

In a preferred configuration, the contact device is constructed with an interconnection ring seated on the stator assembly at the end face as a base body for interconnecting the coils with the phase connections, and with a ring cover seated on the interconnection ring. A particularly suitable contact device for the stator is thus achieved. In particular, a functional separation between the interconnection of the coils achieved by the interconnection ring and between the ring cover is therefore achieved. In particular, in this case, the ring cover is preferably constructed with as smooth or planar a surface as possible, i.e. without flow-swirling elements.

The deflection region of the contact device is incorporated for example in the outer circumference or periphery of the interconnection ring acting as a base body and/or in the outer circumference or periphery of the ring cover. In a suitable development, the deflection region is disposed in particular on the ring cover. A particularly advantageous arrangement of the deflection region is thus achieved.

In a suitable construction, the deflection region is disposed on a tab of the ring cover, which tab encompasses the interconnection ring axially and tangentially, at least in part. The tab is substantially a collar portion of the ring cover, which extends in sections over the outer circumference of the interconnection ring. In other words, the impingement surface of the inflowing fluid which faces the inlet is formed substantially by the tab and the deflection region. A particularly suitable deflection region with particularly low suction pressure losses is thus enabled.

In a suitable embodiment, the ring cover is joined to the interconnection ring in a mechanically fixed manner. In this case, the ring cover is joined to the interconnection ring in particular with form-locking and/or force-locking and/or material connection, for example by adhesion, latching and/or casting. A particularly stable contact device is thus achieved.

A "form-locking" or a "form-locking connection" between at least two mutually connected parts should be understood in this case and below to mean in particular that the cohesion of the mutually connected parts, at least in one direction, is realized by a direct mutual engagement of contours of the parts themselves or by indirect mutual engagement through an additional connecting part. The "blocking" of a mutual movement in this direction is therefore realized as a result of the shape.

A "force-locking" or a "force-locking connection" between at least two mutually connected parts should be understood in this case and below to mean in particular that the mutually connected parts are prevented from sliding against one another due to a friction force acting between them. If a "connecting force" (meaning the force which presses the parts against one another, for example a screw force or weight force itself) creating this friction force is lacking, the force-locking connection cannot be maintained and can therefore become released.

A "material-locking" or a "material connection" between at least two mutually connected parts should be understood in this case and below to mean in particular that the mutually connected parts are held together, possibly under the effect of an additive, at their contact surfaces by material fusion or crosslinking (for example as a result of atomic or molecular bonding forces).

In a possible embodiment, the interconnection ring has a bead-shaped receptacle, in which the deflection region of the ring cover is supported, at least in part. On one hand, the deflection region is thus stabilized so that the deflection region and therefore the ring cover can be constructed in a structurally simpler manner. On the other hand, the deflection region therefore engages in the interconnection ring in sections in the region of the receptacle. An aligning or positioning aid during the assembly of the stator or the contact device is therefore achieved. A particularly compact construction of the contact device in terms of installation space, along with a comparatively deep deflection region, is therefore furthermore enabled. Such a deflection region enables, for example, a fluidically particularly advantageous, comparatively flat, elongated ramp-shaped guidance or diversion of the inflowing fluid.

An additional or further aspect of the invention provides that the deflection region is disposed in a groove center between two adjacent stator teeth of the stator assembly. In other words, the deflection region of the contact device is orientated in particular in such a way that it is disposed substantially between two adjacent coils of the stator. A particularly expedient and fluidically advantageous positioning of the deflection region is thus achieved.

With the objects of the invention in view, there is also provided a contact device which is suitable and constructed for an above-described stator of an electrical coolant drive. In this case, the contact device has, at its outer circumference or periphery, a deflection region for a fluid of the coolant drive. A fluidically particularly suitable contact device is thus achieved, which enables particularly low suction pressure losses in the region of an inlet, in particular in the region of a suction port, and therefore high cooling powers for the stator and/or coolant drive.

With the objects of the invention in view, there is concomitantly provided an electrical coolant drive having a drive housing in which the above-described stator is disposed. In this case, the coolant drive is constructed in particular as a coolant compressor of a motor vehicle. The drive housing has, for example, a radially orientated inlet through the use of which a fluid, in particular suction gas, can be guided into the drive housing. In this case, the stator is disposed within the drive housing in such a way that the fluid entering or flowing in through the inlet impinges on the deflection region, so that particularly low suction pressure losses are achieved.

Other features which are considered as characteristic for the invention are set forth in the appended claims.

Although the invention is illustrated and described herein as embodied in a stator of an electrical coolant drive, a contact device for a stator and an electrical coolant drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
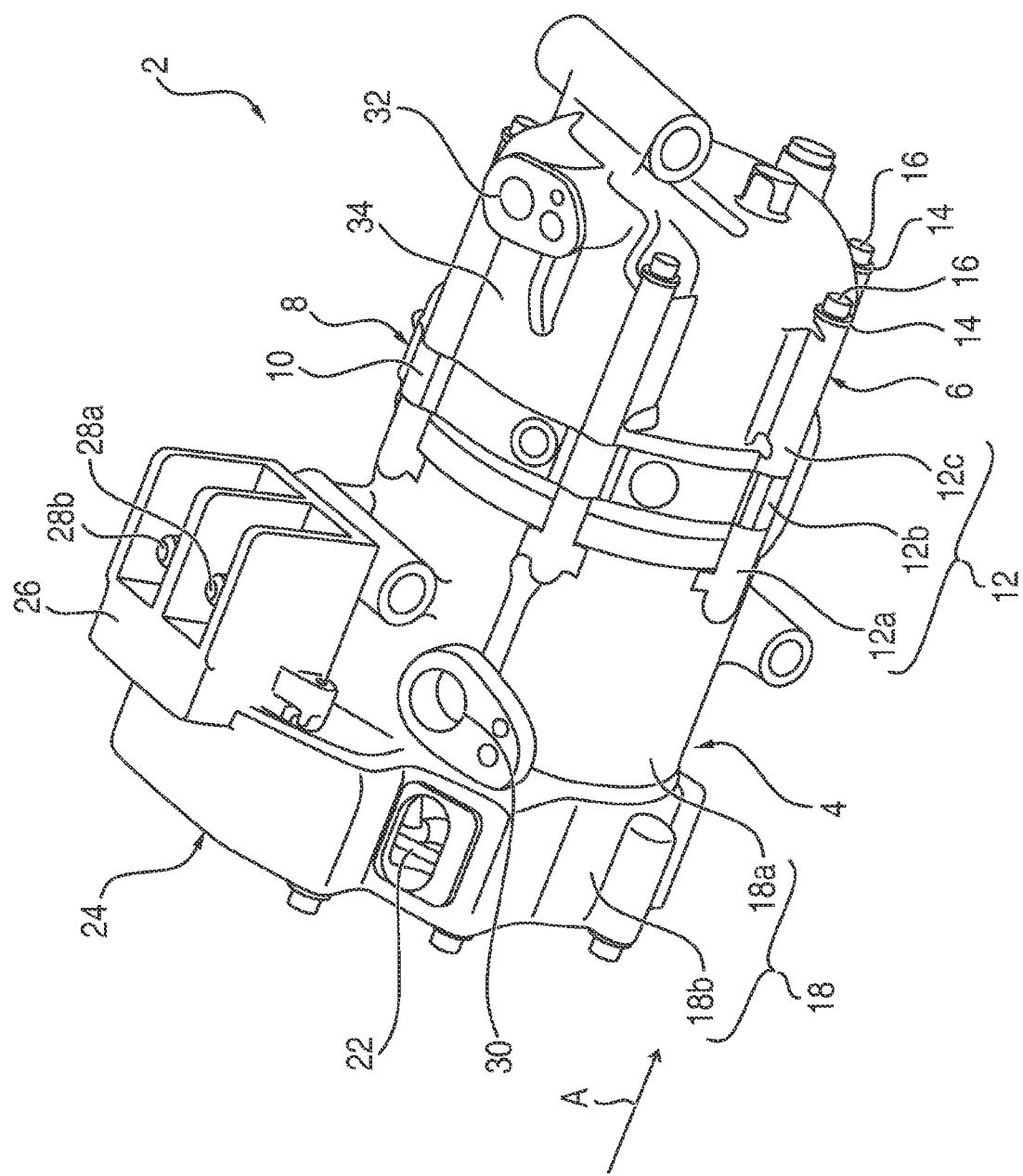
FIG. 1 is a diagrammatic, perspective view of a coolant drive with an electromotive drive and with a compressor.

Referring now in detail to the figures of the drawings, in which mutually corresponding parts and dimensions are always provided with the same reference signs, and first, particularly, to FIG. 1 thereof, there is seen a coolant drive 2 which is preferably used as a coolant compressor in a coolant circuit (not illustrated in more detail) of an air-conditioning unit of a motor vehicle. The electromotive coolant compressor 2 has an electrical (electromotive) drive 4 and a compressor (compressor head) 6 coupled to the drive.

The drive 4 on one hand and the compressor 6 on the other have a modular construction, for example, so that a drive 4 can be coupled to different compressors 6, for example. A transition region formed between the modules 4 and 6 has a mechanical interface 8 having a drive-side end shield 10. In terms of the drive technology, the compressor 6 is connected to the drive 4 through the mechanical interface 8.

For assembly or fastening purposes, the compressor 6 is joined to the drive 4 by six flange connections 12 distributed at the circumference. In this case, the flange connections 12 are integrally formed on the outer circumference or periphery of the coolant compressor 2, in a radially projecting manner, as tab-shaped flanges 12a, 12b, 12c. In this case, the flanges 12a, 12b and 12c each have an axial height along an axial direction A of the coolant compressor 2.

Each flange connection 12 includes a flange 12a of the drive 4, a flange 12b of the end shield 10 and a flange 12c of the compressor 6, which each have mutually flush screw receptacles 14 into which a respective fastening screw 16 can be screwed from the compressor 6. To this end, the screw receptacles 14 of the flange 12a of the drive 4 in particular have an internal thread into which the fastening screw 16 can be screwed or turned with force-lock. The compressor 6 is fastened to the drive 4 in an operationally safe and non-vibrating manner by using the six fastening screws 16 provided therefor. The flange connections 12 are only provided with reference signs by way of example in the figures.

The drive 4 includes a cup-shaped drive housing 18 having two housing sub-regions 18a, 18b, which are separated from one another in a fluid-tight manner by a monolithically integrated housing intermediate wall (partition wall)—not illustrated in more detail—within the drive housing. The drive housing 18 is preferably produced from an aluminum material as a die-cast part.

Figure 2:
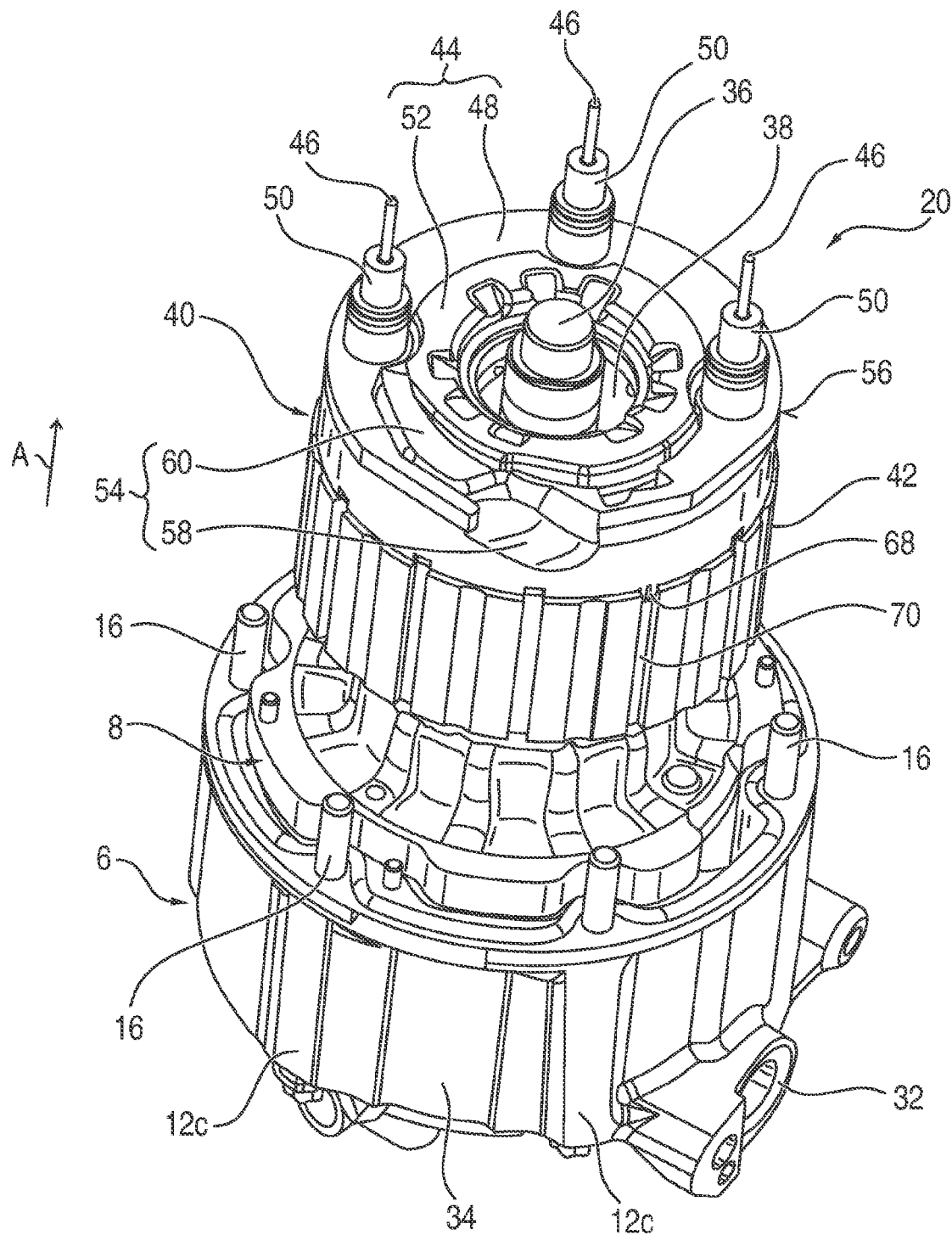
FIG. 2 is a perspective view of a first embodiment of the coolant drive with a stator and with a contact device in a first embodiment.
Figure 3:
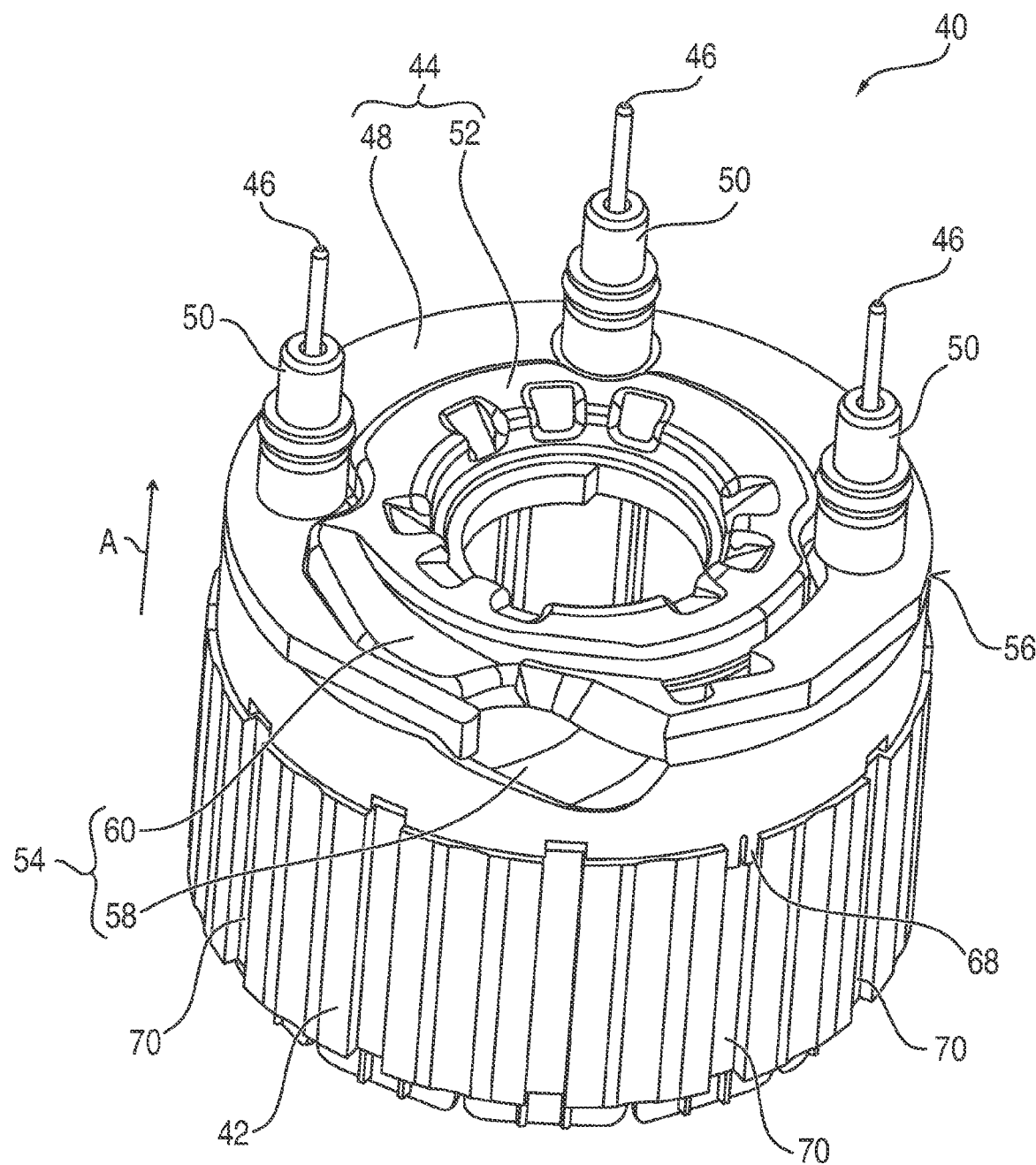
FIG. 3 is a perspective view of the contact device.
Figure 7:
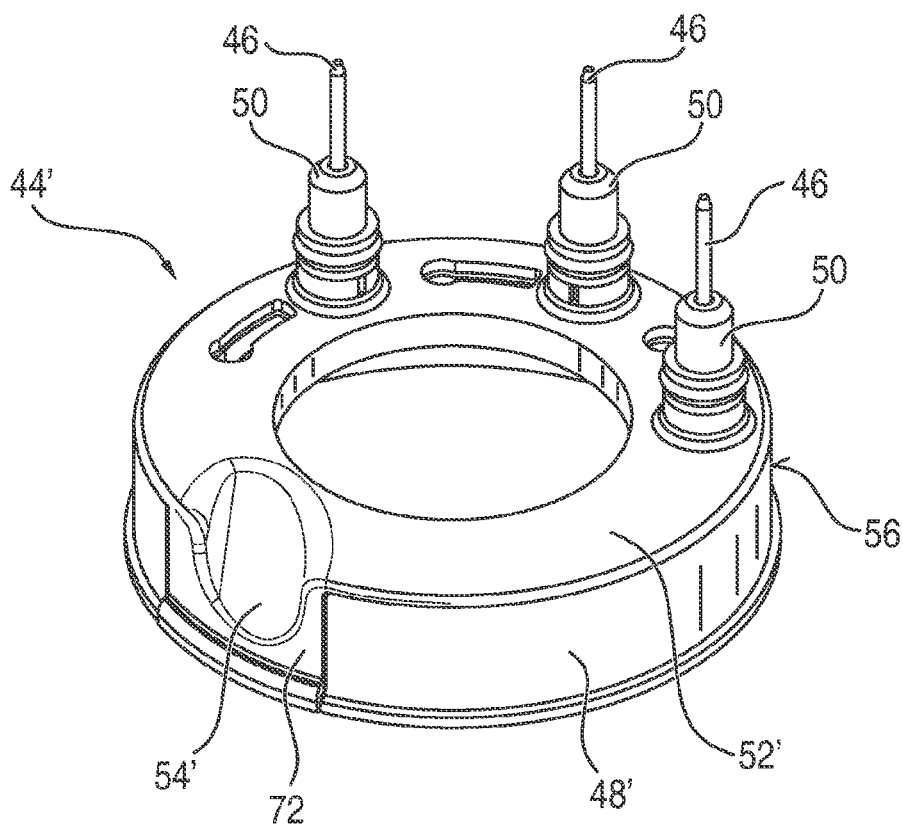
FIG. 7 is a perspective view of the contact device in a second embodiment.

The compressor-side housing sub-region is formed as a motor housing 18a for receiving an electric motor 20 (FIG. 2, FIG. 7). The motor housing 18a is closed on one hand by the (housing) intermediate wall or partition wall and, on the other, by the end shield 10. The housing sub-region lying opposite the partition wall is formed as an electronics housing 18b in which motor electronics 22 controlling the electric motor 20 are received.

The electronics housing 18b is closed towards an end face of the drive 4 which is remote from the compressor 6 by a housing cover (electronics cover) 24. The motor electronics 22 are assembled in the electronics housing 18b when the housing cover 24 is open and are furthermore easily accessible for maintenance or repair purposes when the housing cover 24 is removed.

The drive housing 18 has, in the region of the electronics housing 18b, an electrical connection portion 26 for electrical contacting of the electronics 22 in an on-board power supply of the motor vehicle. The connection portion 26 includes two connections 28a and 28b, which are guided to the electronics 22 and are electrically contacted thereby within the electronics housing 18b.

The drive housing 18 has, approximately at the height of the connection portion 26, a (suction gas) inlet or suction port 30 for connection to the coolant circuit of the air-conditioning unit. A fluid, in particular a suction gas, flows into the drive housing 18, in particular into the motor housing 18a, through the inlet 30. From the motor housing 18a, the fluid flows through the end shield 10 to the compressor 6, which is configured in particular as a scroll compressor. The coolant is subsequently compressed or supercharged by using the compressor 6 and enters into the coolant circuit of the air-conditioning unit from a (coolant) outlet 32 at the bottom of the compressor 6.

The outlet 32 is integrally formed at the bottom of a cup-shaped compressor housing 34 of the compressor 6. In this case, in the connected state, the inlet 30 forms the low-pressure or suction side and the outlet 32 forms the high-pressure or pump side of the coolant compressor 2.

An embodiment of the coolant drive 2 with a 470 V electric motor 20, i.e. with an electric motor with an operating voltage of 470 V (volts) is shown in FIG. 2.

The, in particular, brushless electric motor 20 includes a rotor 38 which is coupled to a motor shaft 36 in a torsion-resistant manner and is rotatably disposed within a stator 40. The stator 40 includes a stator assembly 42 having twelve inwardly directed stator teeth to which a stator or rotating field winding of the electric motor 20 is applied.

The coil windings are wound as coils on insulating winding supports or coil supports, for example, and seated with these on the stator teeth of the stator assembly 42. In this case, each of the frame-shaped winding supports is provided to support a coil or coil winding as part of the stator winding.

The coil ends of the (individual) coils are interconnected by a contact device 44, seated on the stator 40 at the end face, to form the 3 phase stator or rotating field winding in this exemplary embodiment. In electromotive operation, the energized windings of the stator winding generate a stator-side magnetic field, which interacts with permanent magnets of the rotor 38 of the brushless electric motor 20, which rotor rotates around the central stator or motor shaft or axis 36.

In this case, the coil ends of the coils are interconnected to form the phases or phase windings, wherein each phase has a phase connection 46. In this case, the interconnection of the coil ends takes place in particular in a base body 48 of the contact device 44.

The phases of the stator winding of the brushless electric motor 20 are interconnected in a star or delta connection, for example. The electric motor 20 in this exemplary embodiment in particular has a three-phase construction and therefore has three phase ends or phase connections 46. The phase ends 46 are each provided with a sleeve-shaped or collar-shaped plated through-hole 50, which guides the respective phase connection 46 through the housing intermediate wall or partition wall between the motor housing 18a and the electronics housing 18b and into the electronics housing 18b in a leak-tight, in particular pressure-tight and gas-tight, and electrically insulated manner.

A first embodiment of the contact device 44 is explained in more detail below with reference to FIG. 2 to FIG. 5.

In this exemplary embodiment, the contact device 44 is constructed in two parts with the radially external, annular base body 48 and a radially internal, annular inner body 52.

In the base body 48 (also referred to as an interconnection ring below), the coil ends are interconnected and guided to the phase connections 46, wherein the interconnection or contacting of the coil ends of the coils takes place in the radially internal region of the inner body 52 (also referred to as a ring cover below), which is seated on the contacted coil ends as a cover and for protection thereof.

The contact device 44 has a deflection region 54, which is incorporated as a bead-shaped depression, i.e. as a cutout or indentation, in the outer circumference or periphery 56 of the contact device 44 or the interconnection ring 48. In this case, the deflection region 54 is disposed in the region of the inlet 30 in the assembled state, so that the fluid or suction gas flowing in radially through the inlet impinges on the deflection region 54 of the contact device 44.

In this embodiment, the deflection region 54 is constructed in two parts and has an impingement region 58, which is disposed on the interconnection ring 48, and an approximately ramp-shaped guide region 60, which adjoins or leads into the impingement region and is disposed on the ring cover 52.

Figure 4:
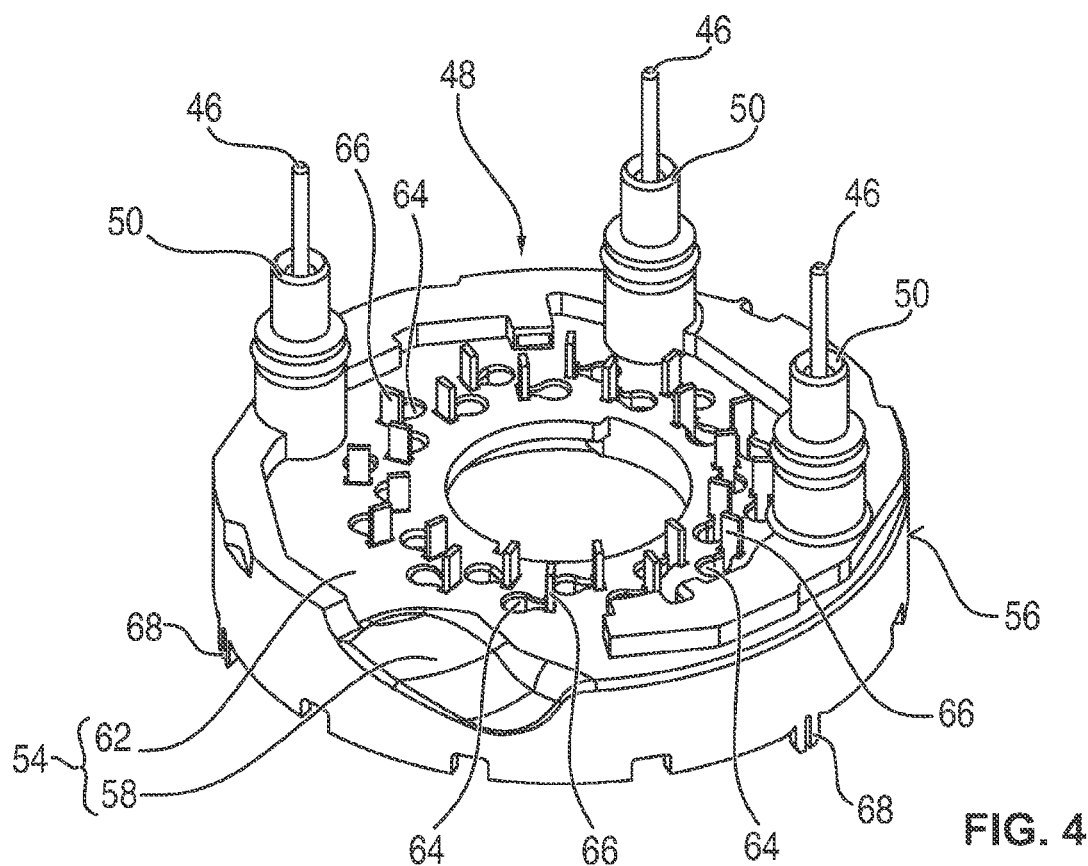
FIG. 4 is a perspective view of a base body of the contact device, looking onto a deflection region.
Figure 5:
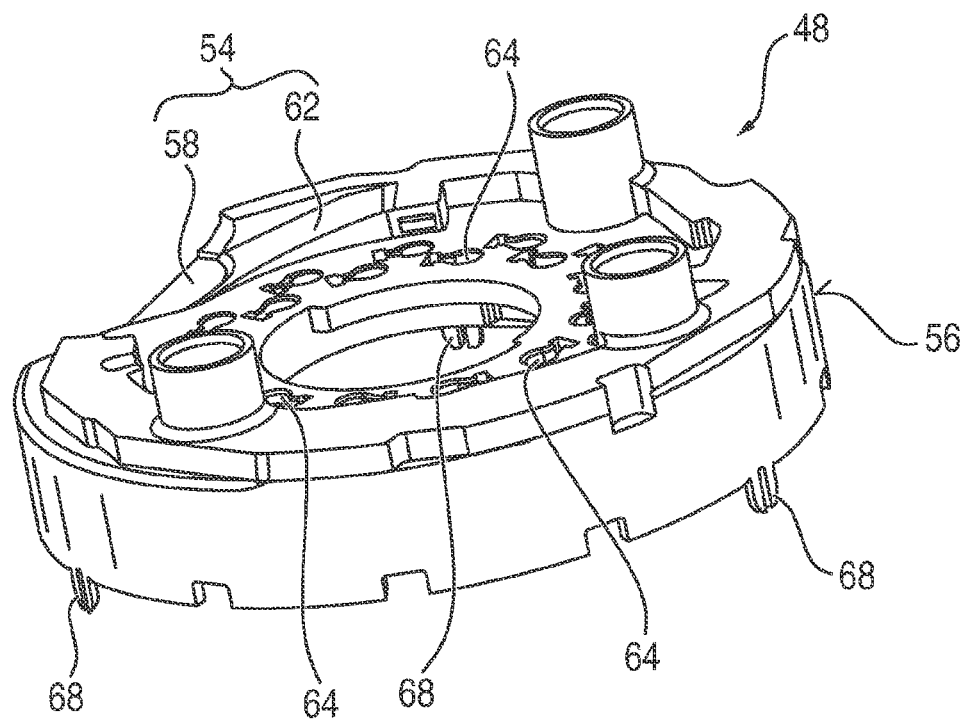
FIG. 5 is a perspective view of the base body, looking onto a ramp-shaped guide region of the deflection region.

In this case, as can be seen in particular in FIG. 4 and in FIG. 5, the interconnection ring 48 can additionally or alternatively have a guide region 62 as an elongation of the impingement region 58, so that the ring cover 52 can also be constructed without the guide region 60. In such an embodiment, the deflection region 54 would be constructed in particular in one part, i.e. simply integrated in the interconnection ring 48.

The deflection region 54 has a radial and tangential course tapering approximately radially inwards in a spiral. The impingement region 58 of the deflection region 54 is preferably disposed approximately in a groove center between two adjacent stator teeth or coils.

In this case, the impingement region 58 facing the inlet 30 is offset axially with respect to an end face of the contact device 48 which has the phase connections 46. This means that the deflection region 54 has an inclination along the axial direction A from the radially external impingement region 58 to the radially internal guide region 60, 62. The deflection region 60, 62 is incorporated in the contact device 48 in such a way that it is sloped or angled in relation to the axial direction A.

The inflowing suction gas is deflected or guided radially inwards in a spiral in a gentle manner, i.e. substantially without swirling or turbulences of its mass flow, as a result of the deflection region 58. In this case, the deflection region 58 is expediently constructed to be as smooth and planar as possible so that the suction gas flowing or guided along it is not swirled. Suction pressure losses in the inflow or inlet region of the coolant drive 2 are reduced as a result of the deflection region 58. In other words, the contact device 44 is formed by the deflection region 58 in particular as a flow-improving component in the interior of the drive housing 18 or the motor housing 18a.

The suction gas which is thus guided to the electronics-side end face of the electric motor 20 therefore flows past the housing intermediate wall or partition wall and therefore, on one hand, cools the electronics 22 in the electronics housing 18b. On the other hand, the suction gas flows along the axial direction A through the electric motor 20, i.e. in particular through the clearance or gap region between the rotor 38 and the pole-shoe-side ends of the stator teeth of the stator 40 or the stator assembly 42, whereby the energized coil windings are cooled, for example. The performance and the service life of the coolant drive 2 are thus improved.

FIG. 4 and FIG. 5 show the interconnection ring 48 with a removed or unseated ring cover 52. As can be seen comparatively clearly in the illustration of FIG. 4, the coil ends of the coils can be guided through radially internal, axial lead-through openings 64 and contacted by contact lugs 66 at the upper side of the interconnection ring 48 to form the internal interconnection (FIG. 7). By way of example, the coil ends are welded to the contact lugs 66 with a material connection.

After the contacting, the coil ends and contact lugs 66 are covered by the ring cover 52. Particularly simple contacting and interconnection of the stator winding, with reduced effort, is thus enabled. The lead-through openings 64 and contact lugs 66 are only provided with reference signs by way of example in the figures.

For operationally safe and reliable covering of the contacted coil ends and contact lugs 66, the ring cover 52 is preferably joined to the interconnection ring 48 in a mechanically fixed manner. In this case, the ring cover 52 is joined or joinable to the interconnection ring 48 by adhesion, latching and/or casting, for example.

The contact device 44 is fastened or fastenable to the stator assembly 42 with form-locking and/or force-locking by using axial latching tongues 68 of the interconnection ring 48. The latching tongues 68 are distributed at the outer circumference or periphery 56 and disposed on the side of the interconnection ring 52 which faces the stator assembly 42. In this case, the stator assembly 42 has, at its outer circumference or periphery, axially extending grooves 70 (only provided with reference signs by way of example in the figures), in which the latching tongues 68 engage in a clamping manner for fastening purposes. The contact device 44 is latched to the stator assembly, or fastened thereto by clamping, in a non-destructive manner.

Figure 6:
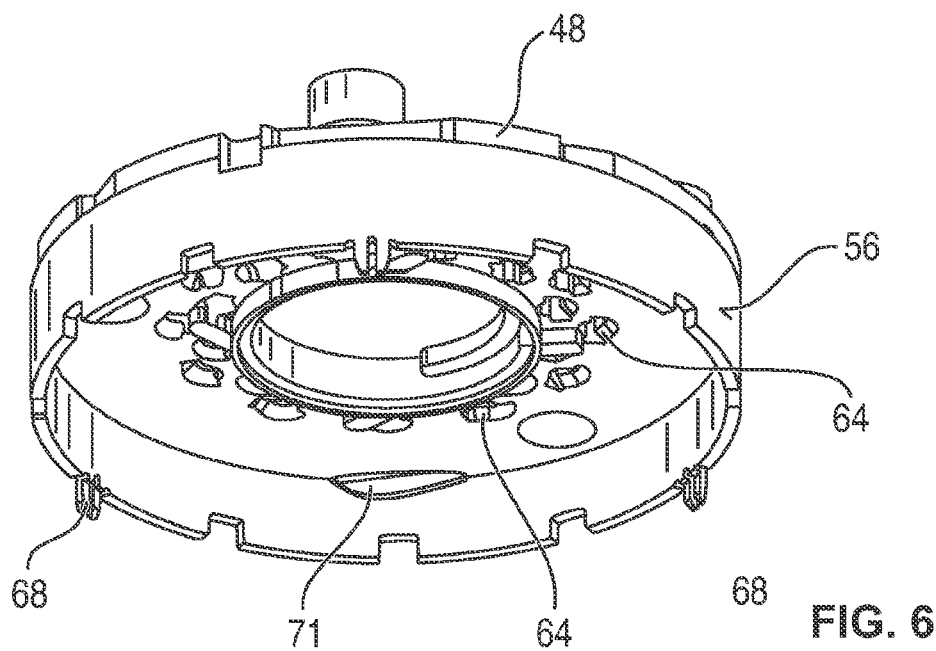
FIG. 6 is a perspective view of the base body, looking onto an underside.

As can be seen in particular in the illustration of FIG. 6, a protrusion 71 is provided on the underside of the interconnection ring 48 in the deflection region 54, or in the impingement region 58. The approximately curved or crown-shaped protrusion 71 is a local thickened wall portion of the interconnection ring 48, which is disposed on the underside of the interconnection ring 48, substantially opposite the upper-side impingement region 58. The wall strength or wall thickness of the interconnection ring 48 is thus also kept substantially constant in the deflection region 54 or impingement region 58, so that, in mechanical terms, the interconnection ring 48 is constructed in a particularly stable and robust manner.

A second exemplary embodiment of the contact device 44' for the coolant drive 2 is shown in FIG. 7. In this embodiment, the contact device 44' has a ring cover 52', which covers the interconnection ring 48' substantially entirely in the axial direction.

The ring cover 52' has an axial tab 72, which surrounds the outer circumference or periphery of the interconnection ring 52' in sections as a radially external side wall. The tab 72 therefore has a tangential course along the interconnection ring 52'. In this embodiment, the deflection region 54' is provided on the ring cover 52', in particular in the region of the tab 72. The deflection region 54' has a course orientated at a slope to the radial and tangential direction. The radially external opening or end face region of the deflection region 54', which faces the inlet 30, extends to approximately half the axial height of the interconnection ring 48'. In this case, the deflection region 54' has an axial inclination along its course. The impinging suction gas is thus guided radially inwards in a spiral through the deflection region 54'.

An embodiment of the coolant drive 2 with a 48 V electric motor 20, i.e. with an electric motor 20 with an operating voltage of 48 V (volts), is shown and explained in more detail below with reference to FIG. 8. The electric motor 20 in this embodiment is constructed in particular with 6 phases, and therefore accordingly has six phase ends or phase connections 46.

Figure 8:
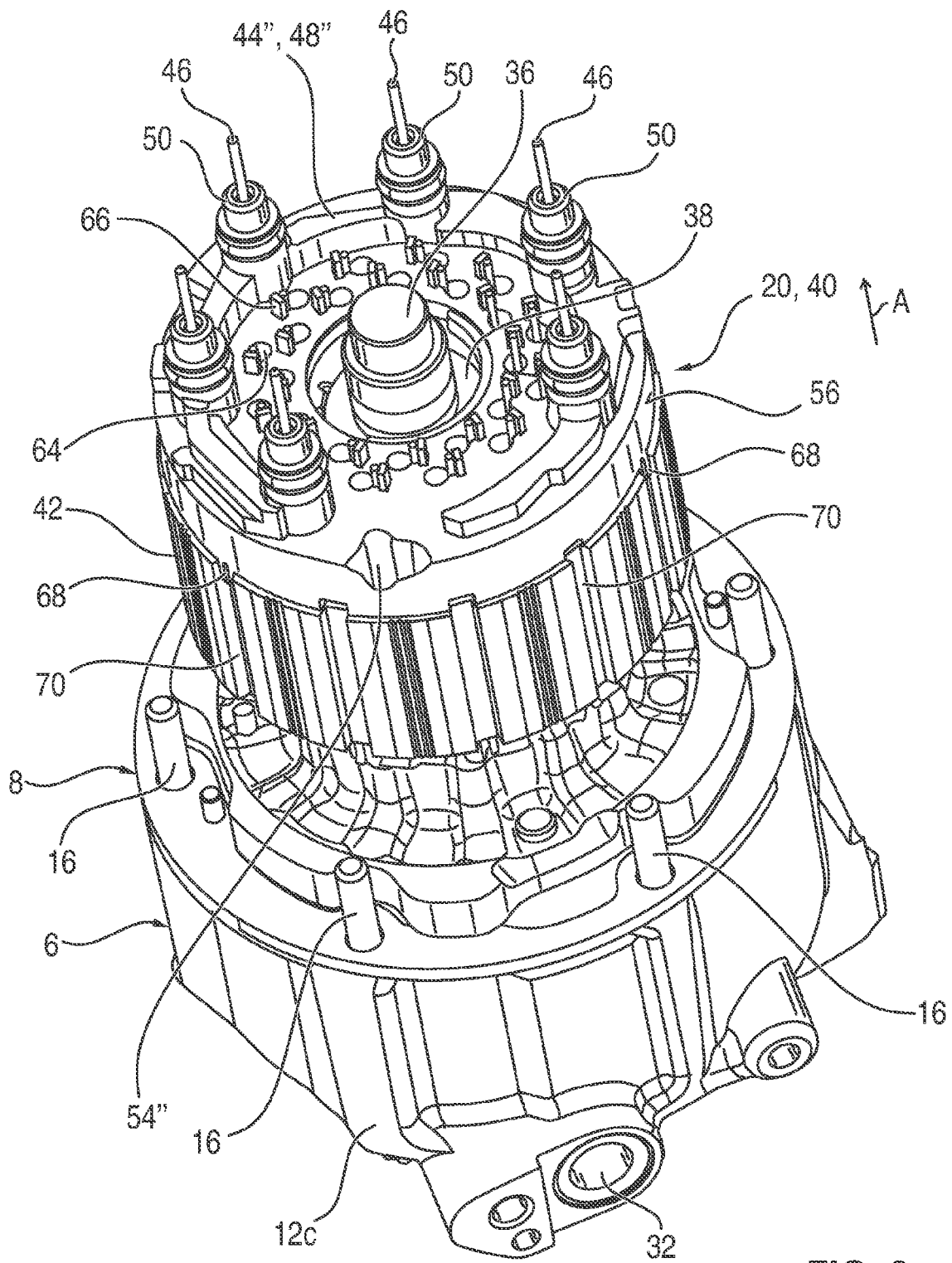
FIG. 8 is a perspective view of a second embodiment of the coolant drive with a stator and with a contact device in a second embodiment.

A third exemplary embodiment of the contact device 44' is shown in FIG. 8. The contact device 44' in FIG. 8 is illustrated without the associated ring cover, in other words only the interconnection ring 48" is shown.

Figure 9:
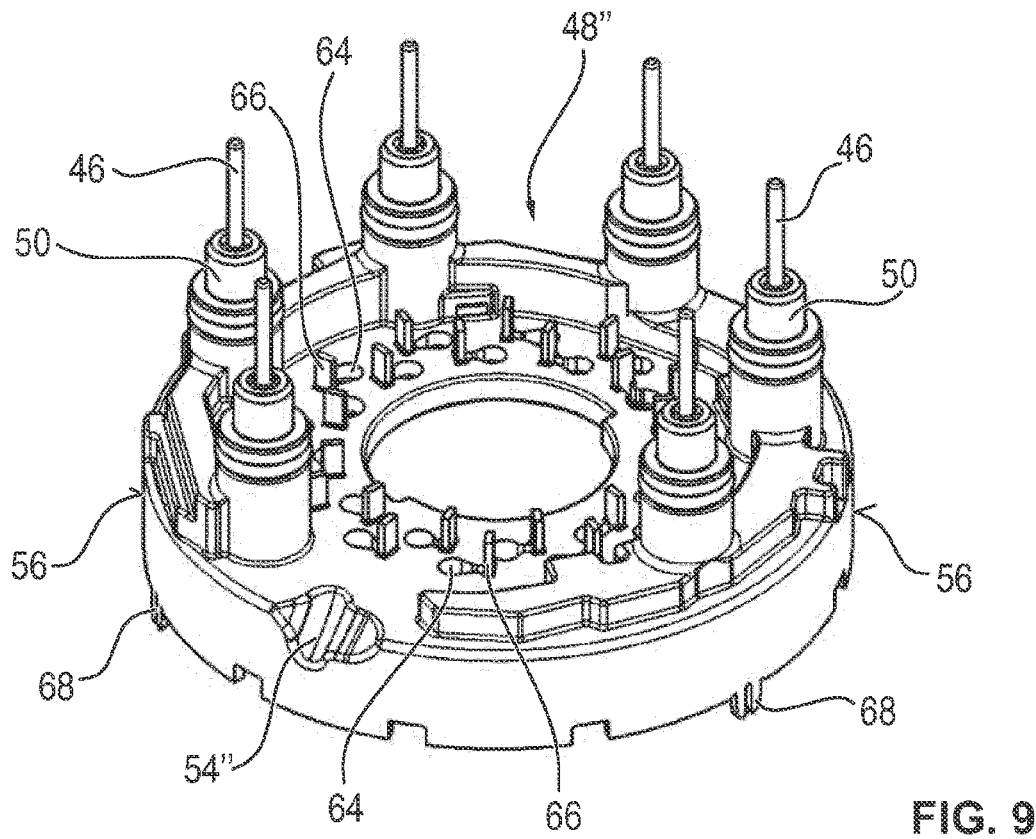
FIG. 9 is a perspective view of the contact device in a third embodiment.

In this case, the embodiment of the interconnection ring 48" corresponds substantially to the above-described first embodiment 48 of FIG. 4, wherein—as can be seen in particular in FIG. 9—the deflection region 54" is disposed at the outer circumference or periphery 56 of the interconnection ring 48'. In this case, the deflection region 54" is formed substantially by a bead-shaped depression in the body of the interconnection ring 48", which depression corresponds to the impingement region 58. The ring cover in this embodiment can have, for example, a guide portion as an elongation or continuation of the deflection region 5".

Figure 10:
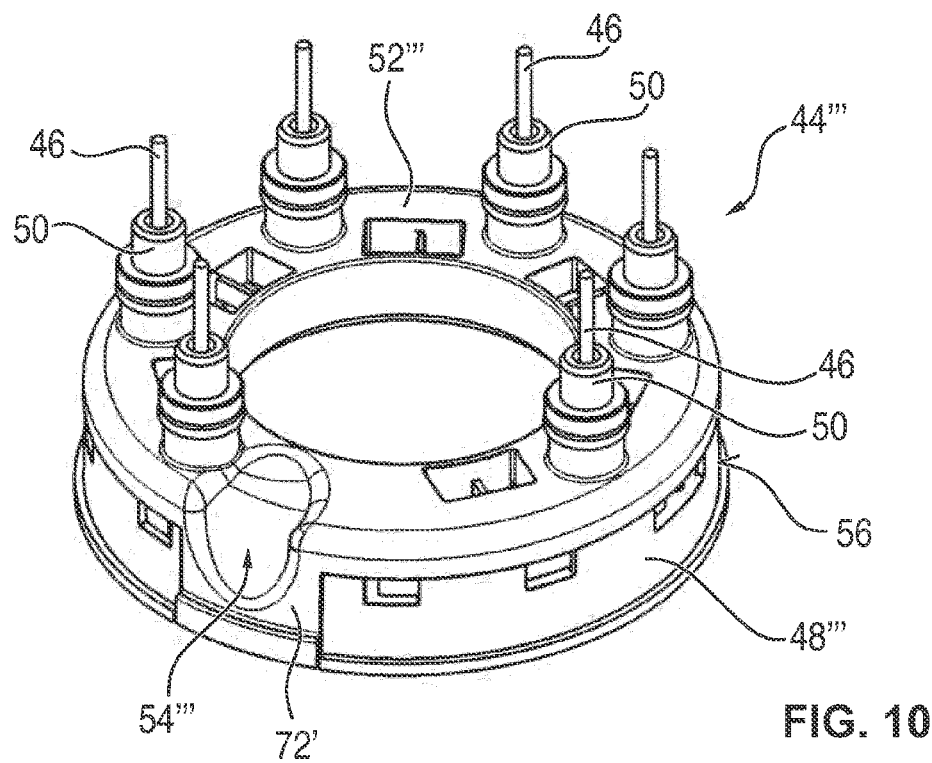
FIG. 10 is a perspective view of the contact device in a fourth embodiment.

The fourth embodiment of the contact device 4''' shown in FIG. 10 corresponds substantially to a six phase embodiment of the above-described contact device 44' of FIG. 7, in which the deflection region 54''' is disposed on a tab 72' of the ring cover 52''', which tab extends axially and tangentially along the outer edge of the interconnection ring 48'''.

The invention is not restricted to the above-described exemplary embodiments. Instead, other variants of the invention can also be derived therefrom by a person skilled in the art without deviating from the subject matter of the invention. In particular, all individual features described in connection with the exemplary embodiments can be further combined with one another in a different manner without deviating from the subject matter of the invention.

The following is a summary list of reference numerals and the corresponding structure used in the above description of the invention.

LIST OF REFERENCE SIGNS

2 Coolant drive
4 Drive
6 Compressor
8 Interface
10 End shield
12 Flange connection
12a, 12b, 12c Flange
14 Screw receptacle
16 Fastening screw
18 Drive housing
18a Housing sub-region/motor housing
18b Housing sub-region/electronics housing
20 Electric motor
22 Electronics
24 Housing cover
26 Connection portion
28a, 28b Connection
30 Inlet
32 Outlet
34 Compressor housing
36 Motor shaft
38 Rotor
40 Stator
42 Stator assembly
44, 44', 44'', 44''' Contact device
46 Phase connection
48, 48', 48'', 48''' Base body/interconnection ring
50 Plated through-hole
52, 52', 52''' Inner body/ring cover
54, 54', 54'', 54''' Deflection region
56 Outer circumference or periphery
58 Impingement region
60 Guide region
62 Guide region
64 Lead-through opening
66 Contact lug
68 Latching tongue
70 Groove
71 Protrusion
72, 72' Tab
A Axial direction

The invention claimed is:

1. A stator of an electrical coolant drive, the stator comprising:
   a stator assembly including an end face and a plurality of stator teeth having coils of a multi-phase stator winding;
   a contact device having an outer periphery, said contact device disposed on said end face of said stator assembly for interconnecting said coils with phase connections; and
   a deflection region disposed at said outer periphery of said contact device in a region of an inlet of the coolant drive, said deflection region deflecting a fluid flowing in through the inlet, and said deflection region being incorporated as a bead-shaped depression in said outer periphery of said contact device.

2. The stator according to claim 1, wherein said deflection region deflects the inflowing fluid radially inwards in a spiral.

3. The stator according to claim 1, wherein said contact device has an interconnection ring seated on said end face of said stator assembly for interconnecting said coils and said phase connections, and a ring cover seated on said interconnection ring.

4. The stator according to claim 3, wherein said deflection region is disposed on said ring cover.

5. The stator according to claim 3, wherein said ring cover has a tab at least partially encompassing said interconnection ring axially and tangentially, and said deflection region is disposed on said tab.

6. The stator according to claim 3, wherein said ring cover is mechanically fixedly joined to said interconnection ring.

7. The stator according to claim 1, wherein said deflection region is disposed in a groove center between an adjacent two of said stator teeth of said stator assembly.

8. A contact device for a stator of an electrical coolant drive according to claim 1, the contact device comprising:
   a deflection region disposed at said outer periphery of said contact device for deflecting a fluid.

9. An electric coolant drive, comprising:
   a drive housing having an inlet; and
   a stator according to claim 1 disposed in said drive housing.

* * * * *